US007230929B2

(12) United States Patent
Betker et al.

(10) Patent No.: US 7,230,929 B2
(45) Date of Patent: Jun. 12, 2007

(54) METHOD AND SYSTEM FOR DYNAMICALLY ASSIGNING DOMAIN IDENTIFICATION IN A MULTI-MODULE FIBRE CHANNEL SWITCH

(75) Inventors: Steven Manning Betker, Shoreview, MN (US); Timothy R. Vitters, Bloomington, MN (US); Renae M. Weber, Minneapolis, MN (US)

(73) Assignee: QLogic, Corporation, Aliso Viejo, CA (US)

( * ) Notice: Subject to any disclaimer, the term of this patent is extended or adjusted under 35 U.S.C. 154(b) by 984 days.

(21) Appl. No.: 10/200,393

(22) Filed: Jul. 22, 2002

(65) Prior Publication Data

US 2004/0013092 A1 Jan. 22, 2004

(51) Int. Cl.
 *H04L 12/28* (2006.01)
(52) U.S. Cl. .................................. 370/254; 370/360
(58) Field of Classification Search ............... 370/360, 370/254, 447, 462, 395.1, 461, 395.7, 396, 370/389, 422, 471
See application file for complete search history.

(56) References Cited

U.S. PATENT DOCUMENTS

| 4,162,375 | A | 7/1979 | Schlichte | 179/15 |
| 4,425,640 | A | 1/1984 | Philip et al. | 370/58 |
| 4,546,468 | A | 10/1985 | Christmas et al. | 370/54 |
| 4,569,043 | A | 2/1986 | Simmons et al. | 370/63 |
| 4,725,835 | A | 2/1988 | Schreiner et al. | 340/825.83 |
| 4,821,034 | A | 4/1989 | Anderson et al. | 340/825 |
| 5,144,622 | A | 9/1992 | Takiyasu et al. | 370/85.13 |
| 5,367,520 | A | 11/1994 | Cordell | 370/60 |
| 5,598,541 | A | 1/1997 | Malladi | 395/286 |
| 5,610,745 | A | 3/1997 | Bennett | 359/139 |
| 5,687,172 | A | 11/1997 | Cloonan et al. | 370/395 |
| 5,748,612 | A | 5/1998 | Stoevhase et al. | 370/230 |
| 5,818,842 | A | 10/1998 | Burwell et al. | 370/397 |
| 5,894,560 | A | 4/1999 | Carmichael et al. | |
| 5,987,028 | A | 11/1999 | Yang et al. | 370/380 |
| 5,999,528 | A | 12/1999 | Chow et al. | 370/365 |
| 6,014,383 | A | 1/2000 | McCarty | 370/453 |
| 6,021,128 | A | 2/2000 | Hosoya et al. | 370/380 |
| 6,047,323 | A | 4/2000 | Krause | 709/227 |
| 6,081,512 | A | 6/2000 | Muller et al. | 370/256 |

(Continued)

FOREIGN PATENT DOCUMENTS

EP 0649098 9/1994

(Continued)

OTHER PUBLICATIONS

Clark, Tom, "Zoning for Fibre Channel Fabrics", Vixel Corporation Paper—XP002185194., (Aug. 1999), pp. 1-6.

(Continued)

*Primary Examiner*—Chi Pham
*Assistant Examiner*—Alexander O. Boakye
(74) *Attorney, Agent, or Firm*—Klein, O'Neill & Singh, LLP (57) ABSTRACT

A method for entering fabric configuration in a fibre channel system for a multi-module fibre channel switch is provided. The method includes determining if a primary blade has been selected for the multi-module switch; sending exchange fabric parameters to internal ports of the multi-module switch; and processing principal switch selection events.

2 Claims, 10 Drawing Sheets

U.S. PATENT DOCUMENTS

| | | |
|---|---|---|
| 6,118,776 A | 9/2000 | Berman |
| 6,128,292 A | 10/2000 | Kim et al. .................. 370/356 |
| 6,144,668 A | 11/2000 | Bass et al. |
| 6,160,813 A | 12/2000 | Banks et al. ................ 370/422 |
| 6,308,220 B1 | 10/2001 | Mathur ....................... 709/238 |
| 6,324,181 B1 | 11/2001 | Wong et al. ................ 370/403 |
| 6,330,236 B1 | 12/2001 | Ofek et al. .................. 370/369 |
| 6,353,612 B1 | 3/2002 | Zhu et al. |
| 6,370,605 B1 | 4/2002 | Chong |
| 6,411,599 B1 | 6/2002 | Blanc et al. ................ 370/219 |
| 6,424,658 B1 | 7/2002 | Mathur ....................... 370/429 |
| 6,449,274 B1 | 9/2002 | Holden et al. ............. 370/392 |
| 6,467,008 B1 | 10/2002 | Gentry et al. |
| 6,597,691 B1 | 7/2003 | Anderson et al. .......... 370/360 |
| 6,597,777 B1 | 7/2003 | Ho |
| 6,697,359 B1 | 2/2004 | George ....................... 370/257 |
| 6,697,368 B2 * | 2/2004 | Chang et al. ............ 370/395.1 |
| 6,760,302 B1 | 7/2004 | Ellinas et al. |
| 6,886,141 B1 | 4/2005 | Kunz et al. |
| 2001/0038628 A1 | 11/2001 | Ofek et al. .................. 370/392 |
| 2002/0034178 A1 | 3/2002 | Schmidt et al. |
| 2002/0196773 A1 | 12/2002 | Berman |
| 2003/0016683 A1 | 1/2003 | George et al. |
| 2003/0091062 A1 | 5/2003 | Lay et al. |
| 2003/0120983 A1 | 6/2003 | Vieregge et al. |
| 2003/0179748 A1 | 9/2003 | George et al. ............. 370/389 |
| 2003/0189935 A1 | 10/2003 | Warden et al. |
| 2004/0013092 A1 | 1/2004 | Betker et al. |
| 2004/0013125 A1 | 1/2004 | Betker et al. |
| 2004/0024831 A1 | 2/2004 | Yang et al. |
| 2004/0028038 A1 | 2/2004 | Anderson et al. |
| 2004/0141521 A1 | 7/2004 | George ....................... 370/463 |
| 2006/0047852 A1 | 3/2006 | Shah et al. |
| 2006/0074927 A1 | 4/2006 | Sullivan et al. |

FOREIGN PATENT DOCUMENTS

| | | |
|---|---|---|
| EP | 0856969 | 1/1998 |
| WO | WO-98/36537 | 8/1998 |
| WO | WO 03/088050 A1 * | 10/2003 |

OTHER PUBLICATIONS

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369v0 dated Jun. 2, 2003.

Curtis, A. R., "Design Considerations for 10-Gbit Fibre Channel", *Curtis A. Ridgeway, Distinguished I/O Architect. Storage and Computing ASIC's Division, LSI Logic Corp.*.

Malavalli, Kumar, "High Speed Fibre Channel Switching Fabric Devices", *Proceedings of the SPIE, SPIE*, Bellingham, VA, USA vol. 1577, XP000562869, ISSN: 0277-786X,(Sep. 4, 1991),216-226.

Melhem, et al., "Minimizing Wavelength Conversions in WDM Path Establishment", *Computer Science Department, University of Pittsburgh*, Pittsburgh, PA 15260, (2001),197-211.

Ridgeway, Curt, "0GFC-40GFC using 4-lane XAUI's", *LSI Logic Presentation—T11/03-069v0*.

Fibre Channel Switch Fabric—2 (FC-SW-2) Rev 5.4, NCITS working draft proposed American National Standard for Information Technology, Jun. 26, 2001., T11/Project 1305-D/Rev 5.4.

Fibre Channel Generic Services—3 (FC-GS-3) Rev 7.01, NCITS working draft proposed American National Standard for Information Technology, Nov. 28, 2000., T11/Project 1356 D/Rev 7.01.

Brown, Douglas W., "A State-Machine Synthesizer", *18th Design Automation Conference*, (1981),301-305.

* cited by examiner

METHOD AND SYSTEM FOR DYNAMICALLY ASSIGNING DOMAIN IDENTIFICATION IN A MULTI-MODULE FIBRE CHANNEL SWITCH

CROSS REFERENCE TO RELATED APPLICATION

This application is related to U.S. patent application entitled "METHOD AND SYSTEM FOR PRIMARY BLADE SELECTION IN A MULTI-MODULE FIBRE CHANNEL SWITCH", U.S. Ser. No. 10/200,487, having common inventors and Assignee, filed on even date herewith, the disclosure of which is incorporated herein by reference in its' entirety.

BACKGROUND

1. Field of the Invention

The present invention relates to networking systems, and more particularly to systems using fibre channel fabrics for interconnecting fibre channel devices.

2. Background of the Invention

Fibre channel is a set of American National Standard Institute (ANSI) standards which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware. The fibre channel switch provides circuit/packet switched topology by establishing multiple simultaneous point-to-point connections.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives a connection request from one port and automatically establishes a connection to another port. Multiple calls or data transfers happen concurrently through the multi-port fibre channel switch.

A fibre channel switch may use multiple modules (also referred to as "blades" or "blade") connected by fibre channel ports. Conventionally, a multi-module switch should appear to the other devices in the fibre channel fabric as a single switch.

Fibre channel switch addressing is defined by Fibre Channel Standard FC-SW-2. Typically, a 24-bit identifier is used to uniquely identify a switch. The 24 bit address includes a 8-bit Domain Identification ("Domain_ID.") number; 8-bit Area Identifier (Area_ID) and 8-bit Port Identifer (Port_ID), as stated in FC-SW_2 Section 4.8, incorporated herein by reference in its entirety.

Domain_ID identifies a domain of one or more switches that have the same Domain_ID for all N_Ports and NL_Ports (an N_Port that can perform an Arbitrated Loop function). A domain in the fibre channel environment as defined by ANSI Standard X3.289-199X Fibre Channel-Fabric Generic Requirements (FC-FG), incorporated herein by reference in its entirety, is the highest or most significant hierarchical level in a three-level addressing scheme. If there are more than one switch in a Domain, then each switch within the domain is directly connected via an inter-switch link ("ISL") to at least another switch in the domain.

Conventional systems pre-define a Domain_ID when a fibre channel switch is configured. Typically, a switch is assigned a Domain_ID the procedures defined in FC-SW-2. However, if a multi-module switch needs to appear as a single switch to the rest of the Fabric, the Domain_ID assignment procedure must be such that a consistent interface is available within the fabric.

Current Fiber Channel standards do not provide a mechanism to combine multiple switch modules into one switch.

Therefore, what is required is a process and system that can dynamically assign Domain_ID after a primary blade in a multi-module switch is selected.

SUMMARY OF THE INVENTION

In one aspect, the present invention solves the foregoing drawbacks by providing a method for entering fabric configuration in a fibre channel system for a multi-module fibre channel switch. The method includes determining if a primary blade has been selected for the multi-module switch; sending exchange fabric parameters to internal ports of the multi-module switch; and processing principal switch selection events.

In another aspect of the present invention, a method for processing principal switch selection events in a fibre channel system using a multi-module fibre channel switch is provided. The method includes determining if a switch module has received exchange fabric parameters; determining if the switch module has received domain identification values; sending domain identification values to all internal ports; and operating as a non-principal switch if the switch module is also a primary blade.

The method also includes determining if a F_S_TOV timer has expired if no domain identification value is received; and operating as the principal switch if the switch module is a primary blade and the F_S-TOV timer has expired.

In another aspect of the present invention, a method for operating a principal switch in a fibre channel system using a multi-module switch is provided. The method includes sending exchange blade parameters with a local domain assigned value to plural internal ports in the switch module.

In yet another aspect, a method for operating a multi-module switch as a non-principal switch in a fibre channel system is provided. The method includes requesting local domain identification values from other modules; and sending exchange blade parameters with local domain assigned values to internal ports. The method includes isolating the switch module if the local domain assignment value was unsuccessful.

In yet another aspect, a method for domain identification value assignment for a multi-module switch in a fibre channel system is provided. The method includes receiving exchange blade parameters with local domain value assigned; and sending domain identification value assigned flags to external ports.

The method includes isolating external ports if the exchange blade parameter has a rejected value for local domain assignment.

In one aspect of the present invention, Domain_ID may be dynamically assigned.

In another aspect of the present invention, a multi-module switch can act as a principal switch, with the primary blade performing Domain_ID assignments for the multi-module switch and for other external switches. The multi-module switch can also operate as non-principal switch, with the primary blade requesting a Domain_ID assignment on behalf of the multi-module switch and informing the other modules of the assignment.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to a fibre channel system. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

a. "Blade": A module in a multi-module fibre channel switch.
b. "Blade_ID": A unique identifier for identifying a switch module.
c. "B_S_TOV Timer": A timer to detect inactivity during primary blade selection.
d. "E-Port": Expansion port
e. "EBP": Exchange Blade Parameters, created by a Multi-Blade Protocol.
f. "EFP": Exchange Fabric Parameters as defined by FC-SW-2.
g. "Fibre channel ANSI Standard": The standard describes the physical interface, transmission and signaling protocol of a high performance serial link for support of other high level protocols associated with IPI, SCSI, IP, ATM and others.
h. "FC-1": Fibre channel transmission protocol, which includes serial encoding, decoding and error control.
i. "FC-2": Fibre channel signaling protocol that includes frame structure and byte sequences.
j. "FC-3": Defines a set of fibre channel services that are common across plural ports of a node.
k. "FC-4": Provides mapping between lower levels of fibre channel, IPI and SCSI command sets, HIPPI data framing, IP and other upper level protocols.
l. "Fabric": A system which interconnects various ports attached to it and is capable of routing fibre channel frames by using destination identifiers provided in FC-2 frame headers.
m. "Fabric Topology" This is a typology where a device is directly attached to a fibre channel fabric that uses destination identifiers embedded in frame headers to route frames through a fibre channel fabric to a desired destination.
n. F_S_TOV Timer: Defined by FC-SW-2, a time constant used to ensure that fabric stability has been achieved during fabric configuration.
o. Multi Blade protocol: A protocol that operates on internal switch module ports to assign a primary blade and exchange blade parameters.
p. Port: A general reference to N. Sub.—Port or F. Sub.—Port.
q. "Slot Number": A unique identifier for each blade in a multi-module switch derived from the physical location of the blade in a chasis.

The Fibre Channel Specification used to build one embodiment of the present-invention includes:

FC-SW-2 standard as published by the American National Standard Institute.

To facilitate an understanding of the preferred embodiment, the general architecture and operation of a fibre channel system will be described. The specific architecture and operation of the preferred embodiment will then be described with reference to the general architecture of the fibre channel system.

Figure 1:
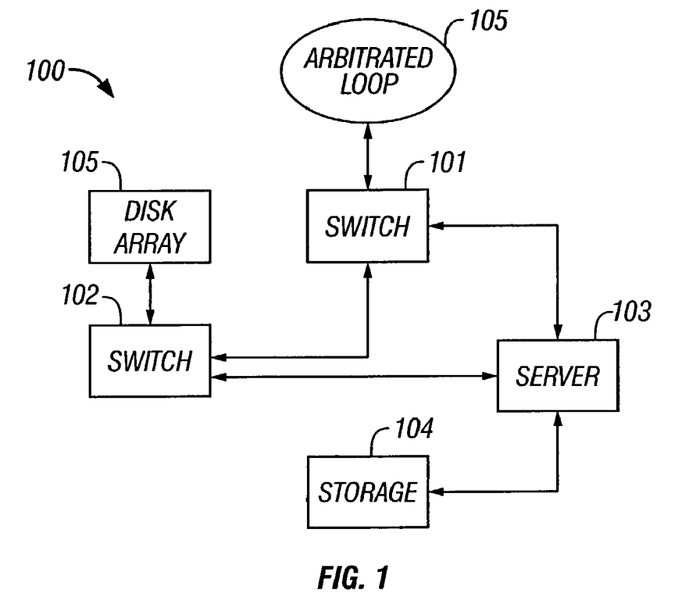
FIG. 1, as described above, shows a block diagram of a fibre channel system using a fibre channel fabric.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 105 may be operationally coupled to switch 101 using arbitrated loop ports (FL;Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Switch 101 includes an E_Port that enables a path to another switch 102. An ISL enables N_Ports to operationally couple to other N-Ports in a fabric.

Figure 2:
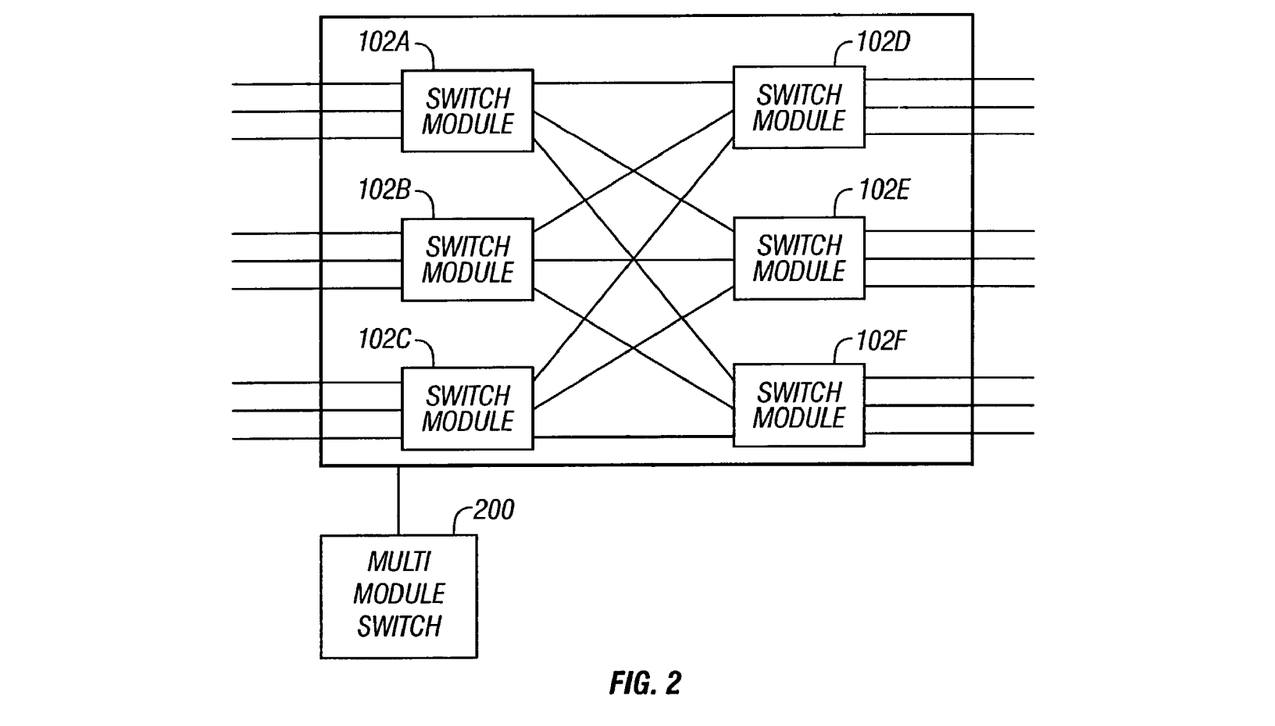
FIG. 2 is a block diagram showing multi-module switch.

FIG. 2 is a block diagram that shows plural switch modules (or blades) 102A–102F integrated into a single multi-switch module 200. Internal ports between the switch modules operate on a multi-blade protocol, while external ports operate under FC-SW-2 protocol.

Figure 3:
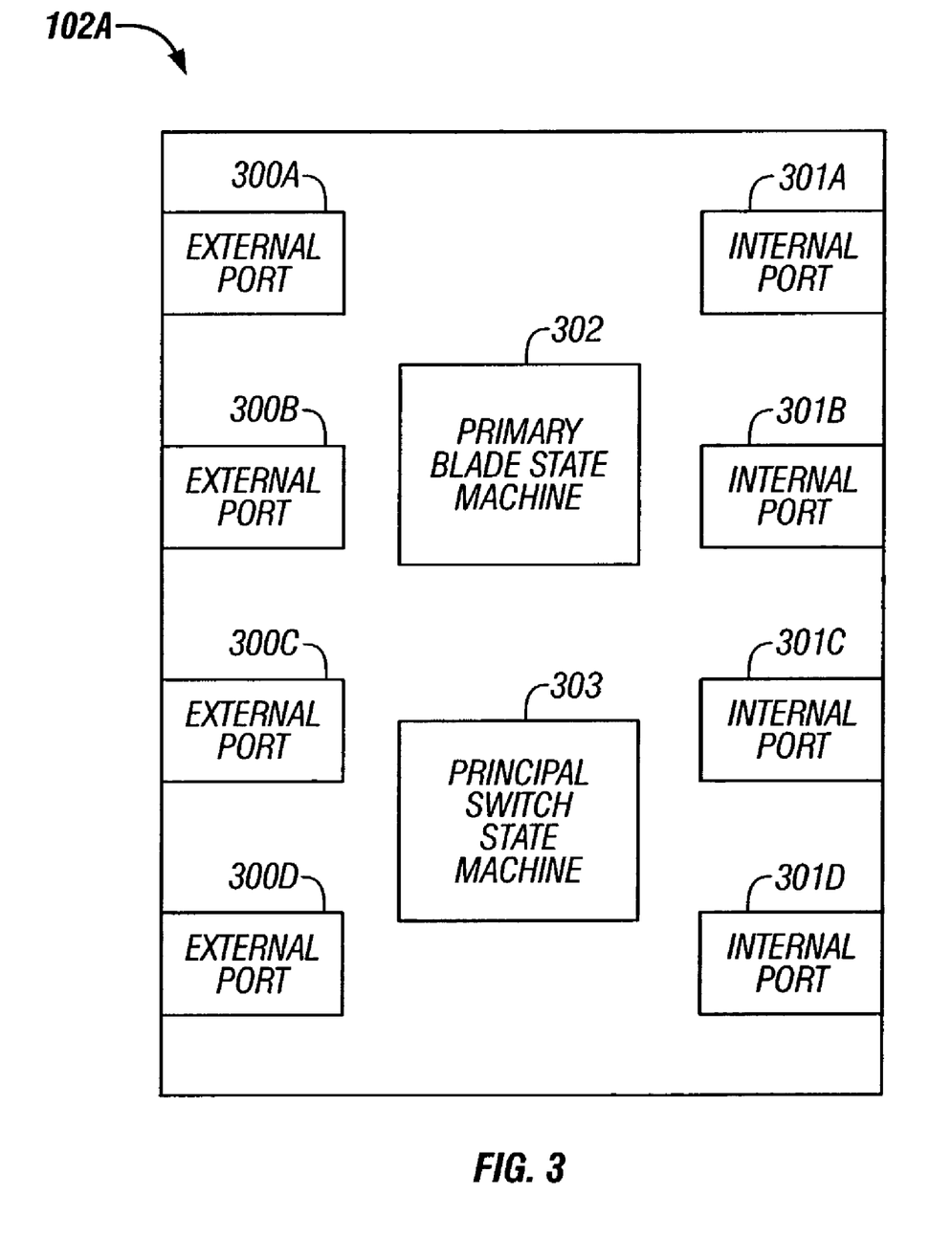
FIG. 3 is block diagram of a switch in a multi-module switch environment that can select a primary blade, according to one aspect of the present invention.

FIG. 3 is a block diagram of a blade in a multi-module switch, e.g. 102A that implement the adaptive aspects of the present invention. Switch module 102A includes plural external ports (F_Ports operationally coupled to other devices, e.g. server 103; or E_Ports coupled to other switch modules) 300A through 300D; and internal ports 301A–301D that operate under the multi-blade protocol.

Switch module 102A also includes a primary blade state machine 302 that uses EBPs under the multi-blade protocol to select the primary blade for module 200.

Also included in switch module 102A is a principal switch state machine 303 that processes principal switch selection and Domain ID assignment for the switch module.

Figure 4:
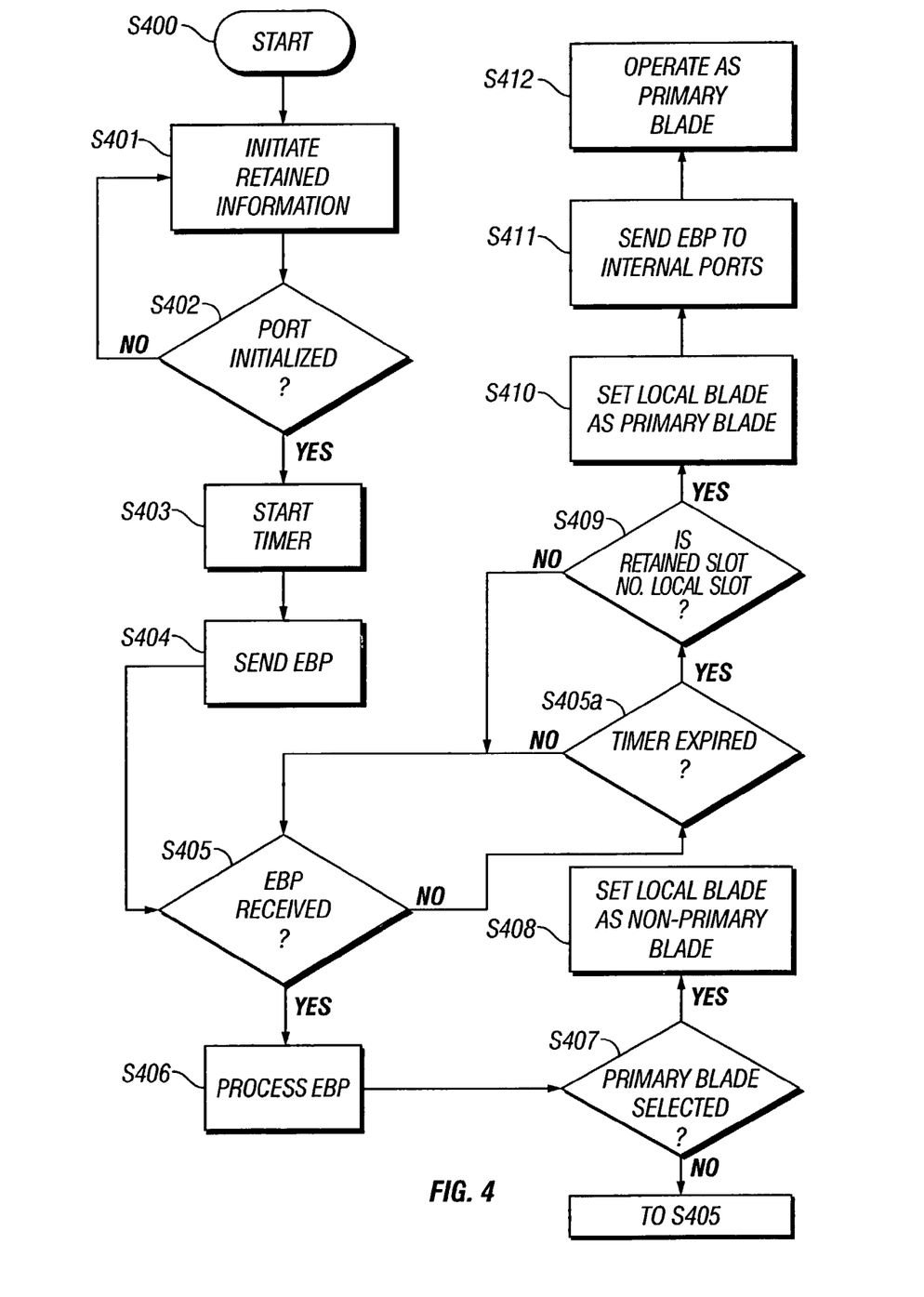
FIG. 4 is a process flow diagram of executable process steps for selecting a primary blade in a multi-module switch environment.

Primary Blade Selection:

FIG. 4 shows a flow diagram of executable process steps for selecting a primary blade in a multi-module switch environment. In one aspect of the present invention EBP parameters are used to select a primary blade, and once a primary blade is selected other blades are notified of the primary blade selection. A blade with the lowest priority and slot number is selected as the primary blade. As defined above, a slot number is unique to a particular blade (or switch module, used interchangeably throughout this specification).

Turning in detail to FIG. 4, in step S400 the process starts and switch module 200 is initialized.

In step S401, retained primary blade priority and blade number is initialized to the blade's priority and blade number.

In step S402, internal ports 301A–301D are initialized.

In step S403, a B_S-TOV timer is started and thereafter, in steps S404, an EBP request is sent to all adjacent blades. In one aspect the B_S_TOV timer (not shown) is operationally coupled or integrated with state machine 302.

An example of an EBP request is provided below:

TABLE 1

EBP Request Payload

| Item | Byte Size |
|---|---|
| Command Code = hex'82' | 1 |
| Reserved | 1 |
| Payload Length | 2 |
| Reserved | 3 |
| Primary Blade Priority | 1 |
| Reserved | 3 |

TABLE 1-continued

EBP Request Payload

| Item | Byte Size |
|---|---|
| Primary Blade Slot Number | 1 |
| Reserved | 3 |
| Primary Blade Assigned | 1 |
| Local Domain_ID Status | 1 |
| Reserved | 2 |
| Local Domain_ID | 1 |
| Reserved | 3 |
| Switch Priority | 1 |
| Design specific data | N |

Payload Length: This field may contain a 16-bit unsigned integer that specifies the total payload length in bytes. This value is hex'18'+size of design specific data.

Primary Blade Priority: This field specifies the priority level of a blade that an EBP transmitting blade believes is the primary blade.

Primary Blade Slot Number: This field specifies the slot number of the blade that the EBP transmitting blade believes is the primary blade. This value uniquely identifies each blade in a switch derived from the physical location of the module in a chassis.

Primary Blade Assigned: This field indicates that the primary blade role is assigned. If zero, the primary blade has not been selected. If non-zero, the primary blade has been selected. Table 2 below shows an example of primary blade values.

TABLE 2

Primary Blade Assigned Status

| value | Comments |
|---|---|
| 0 | Unassigned. Primary blade selection is in progress. |
| 1 | Assigned. Primary blade role assigned. |

Local Domain_ID Status: Indicates Domain_ID status of a blade. The primary blade is responsible for requesting a Domain_ID on behalf of all blades. When Local Domain_ID status is two, blades are permitted to transmit Domain_ID assignment ("DIA") requests on external E_Ports. Allowable values are shown in Table 3.

TABLE 3

Local Domain_ID Status

| value | Comments |
|---|---|
| 1 | Predefined. Local Domain_ID was predefined by configuration data. |
| 2 | Accepted. Local Domain_ID has been granted by principal switch. |
| 3 | Accepted. Local Domain_ID has been granted by principal switch and fabric is in reconfiguration. |
| 4 | Rejected. Local Domain_ID has been rejected by principal switch. |
| 5 | Rejected. Local Domain_ID has been rejected by principal switch and fabric is in reconfiguration. |

Local Domain_ID: This denotes a switch's local Domain_ID.

Switch Priority Value: This denotes a switch's priority as defined by FC-SW-2.

In step S405, the process determines if all switch modules have received an EBP payload. If an EBP payload has been received, then the EBP is processed in step S406, as shown in the process steps of FIG. 5. If a primary blade has been selected, as determined in step S407, the local blade is set as a non-primary blade in step S408. If the primary blade has not been selected, then the process moves back to step S405.

If an EBP is not received in step s405, then in step S405A, the process determines, if the B_S_TOV timer has expired. If the timer has not expired the process moves to step s405.

If the timer has expired, then in step S409, the process determines if the retained slot number is the local slot number. If not, the process moves to step s405.

If the retained slot number is the local slot number, then in step S410, the local blade is set as the primary blade.

In step S411, the primary blade sends EBPs to all internal ports and the selected blade operates as the primary blade in step S412.

Figure 5:
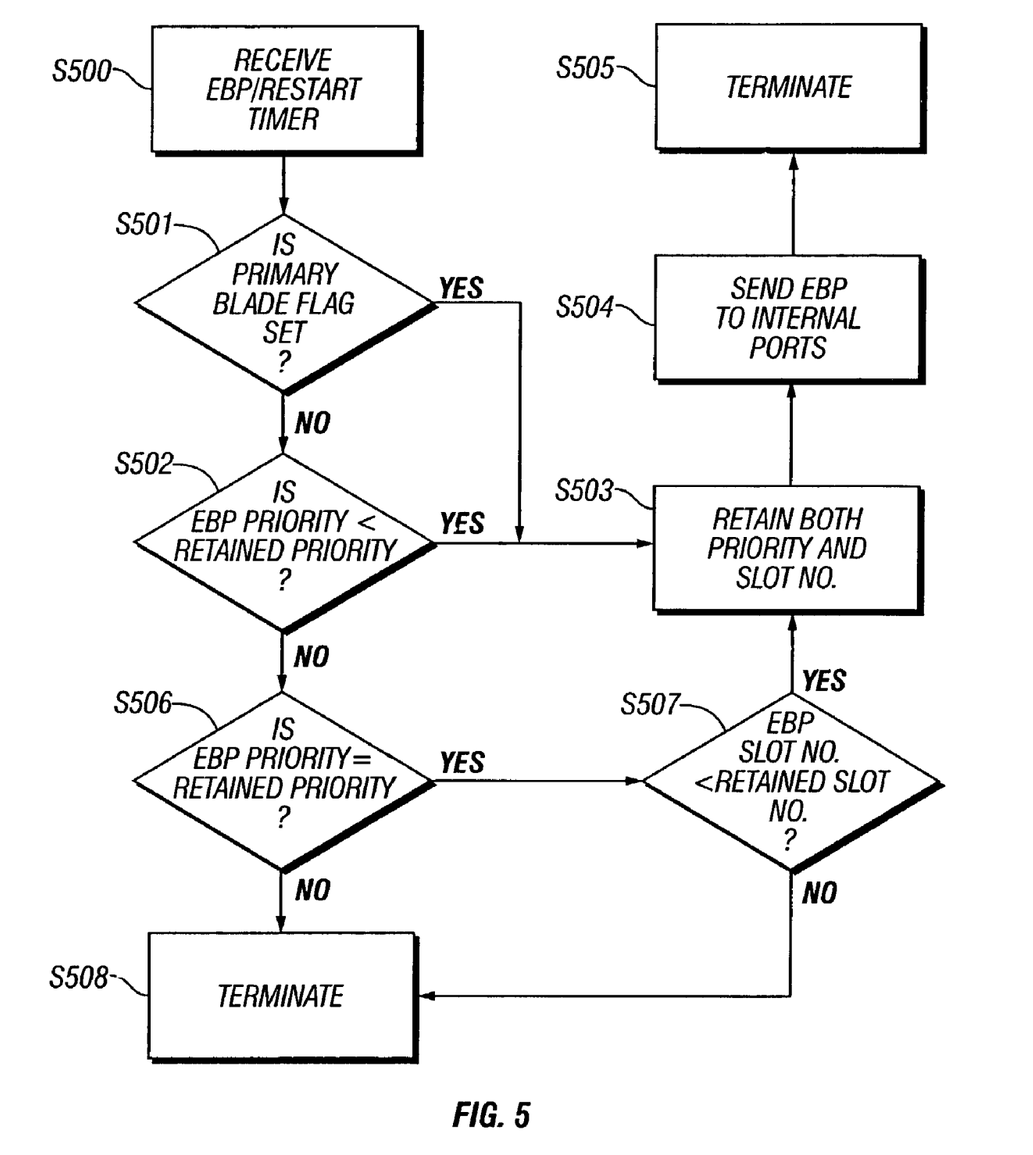
FIG. 5 is a flow diagram of a executable process steps for processing exchange blade parameters for selecting a primary blade, according to one aspect of the present invention.

FIG. 5 is a flow diagram of executable process steps that describes processing of EBPs (step S406) for selecting a primary blade, according to one aspect of the present invention.

Turning in detail to FIG. 5, in step S500, EBP's are received and the B_S_TOV timer is started.

In step S501, the EBP payload is analyzed by primary blade state machine 302, to determine whether a primary blade flag is set. If it is set, then the process moves to step S503, where the EBP priority and slot number replaces the retained priority and slot number.

If the primary blade flag is not set in step S501, then in step S502, the process determines if the EBP priority is less than the retained priority. If it is less, then the process moves to step S503.

If the EBP priority is not less than the retained priority, then in step S506, the process determines if the EBP priority is equal to the retained priority. If not, the process terminates at step S508.

If the EBP priority is equal to the retained priority, then in step S507, the process determines if the EBP slot number is less than the retained slot number. If it is less, then the process moves to step S503. If not, the process terminates at step S508.

Once the EBP priority and slot number are retained in step S503, in step S504 (similar to step S411), EBPs are sent to all internal ports with the selected primary blade and the process terminates in step S505.

Principal Switch and Domain ID Assignment:

A principal switch is selected whenever an external E_Port ISL is established.

Figure 6:
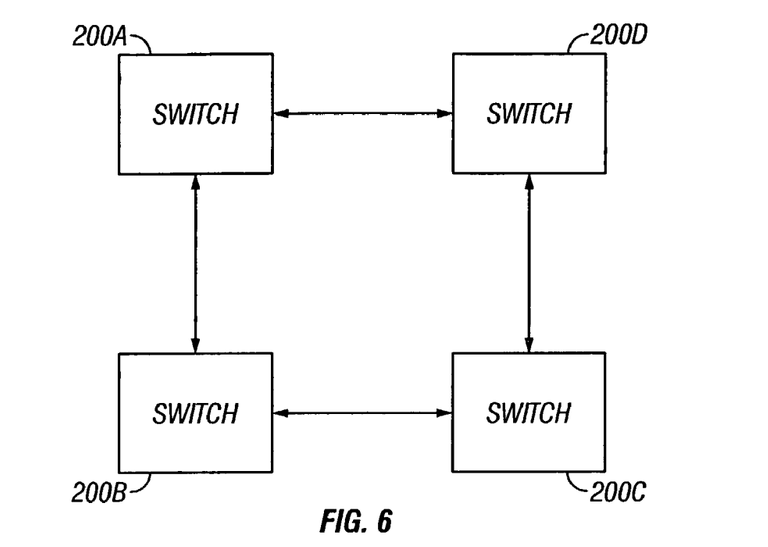
FIG. 6 is a block diagram showing ISLs between plural multi-module switches.

FIG. 6 shows plural multi-module switches 200A–200D operationally coupled to each other. Each multi-module switch has a primary blade that may be selected by the process discussed above. Each switch module (blade) has its own state machine. By following the process steps described below, the switch modules will appear to the rest of the Fabric as a single switch. Non-multi-module switches use the process defined by FC-SW-2.

Figure 7:
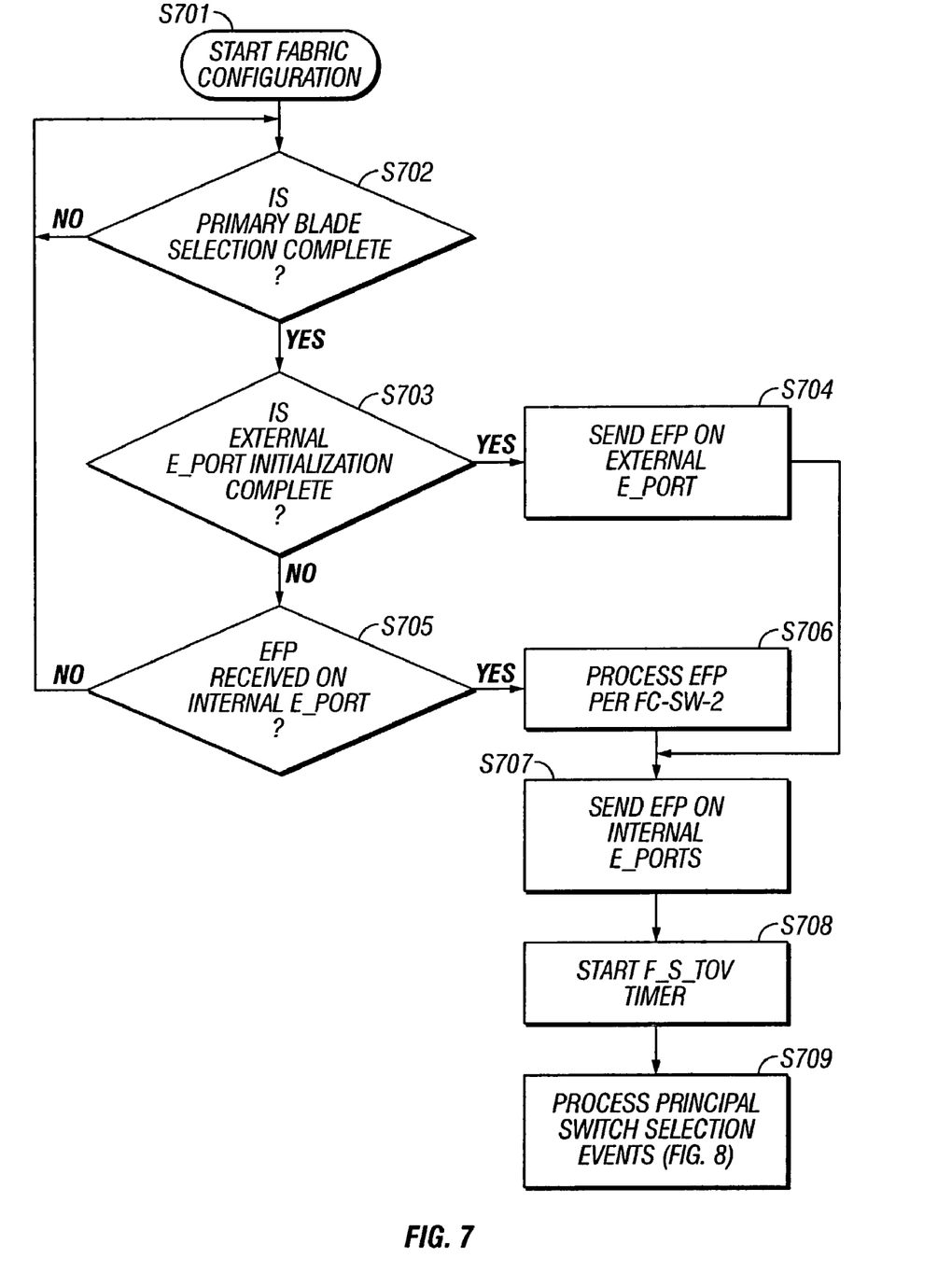
FIG. 7 is a process flow diagram of executable process steps for fabric configuration entry criteria for each blade, according to one aspect of the present invention.

FIG. 7 is a process flow diagram of executable process steps for switch modules in a fabric to enter fabric configuration. In one aspect of the present invention, a primary blade is selected before the principal switch selection process is started. In a single blade switch, the only blade operates as the primary blade. A switch sends EFPs during fabric configuration and inter-blade EFP exchange occurs at the same time. A blade with external E_Port ISL can initiate principal switch selection on behalf of other blades and send EFPs. Other blades receive EFPs on internal ports, signaling the start of principal switch selection. Each blade may also operate independently during EFP exchange.

Turning in detail to FIG. 7, in step S701, a switch module (e.g. 200A) enters fabric configuration. The switch module waits in step S702 for a primary blade to be selected, as described above. After primary blade selection is complete in step S702, the process determines whether an external E_Port is initialized in step S703.

If external E_Port ISL initialization is complete in step S703, the switch module initiates principal switch selection. In step S704, an EFP is sent to external E_Ports as specified in FC-SW-2 and in step S707, EFPs are sent on all internal E_Ports to notify other switch modules that principal switch selection has started.

If external E_Ports are not initialized in step S703, then in step S705, the process determines if an EFP has been received on an internal port, before starting principal switch selection. In step S705, a switch module receiving an EFP on an internal port joins principal switch selection, and in step S706 the EFPs are processed as specified in FC-SW-2.

In step S707, EFPs are sent on all internal E_Ports to notify all other switch modules that principal switch selection has started.

In step S708 each switch module initializes principal switch selection timer F_S_TOV as specified in FC-SW-2. The process then moves to the principal switch selection process in step S709, described below with respect to FIG. 8.

Figure 8A:
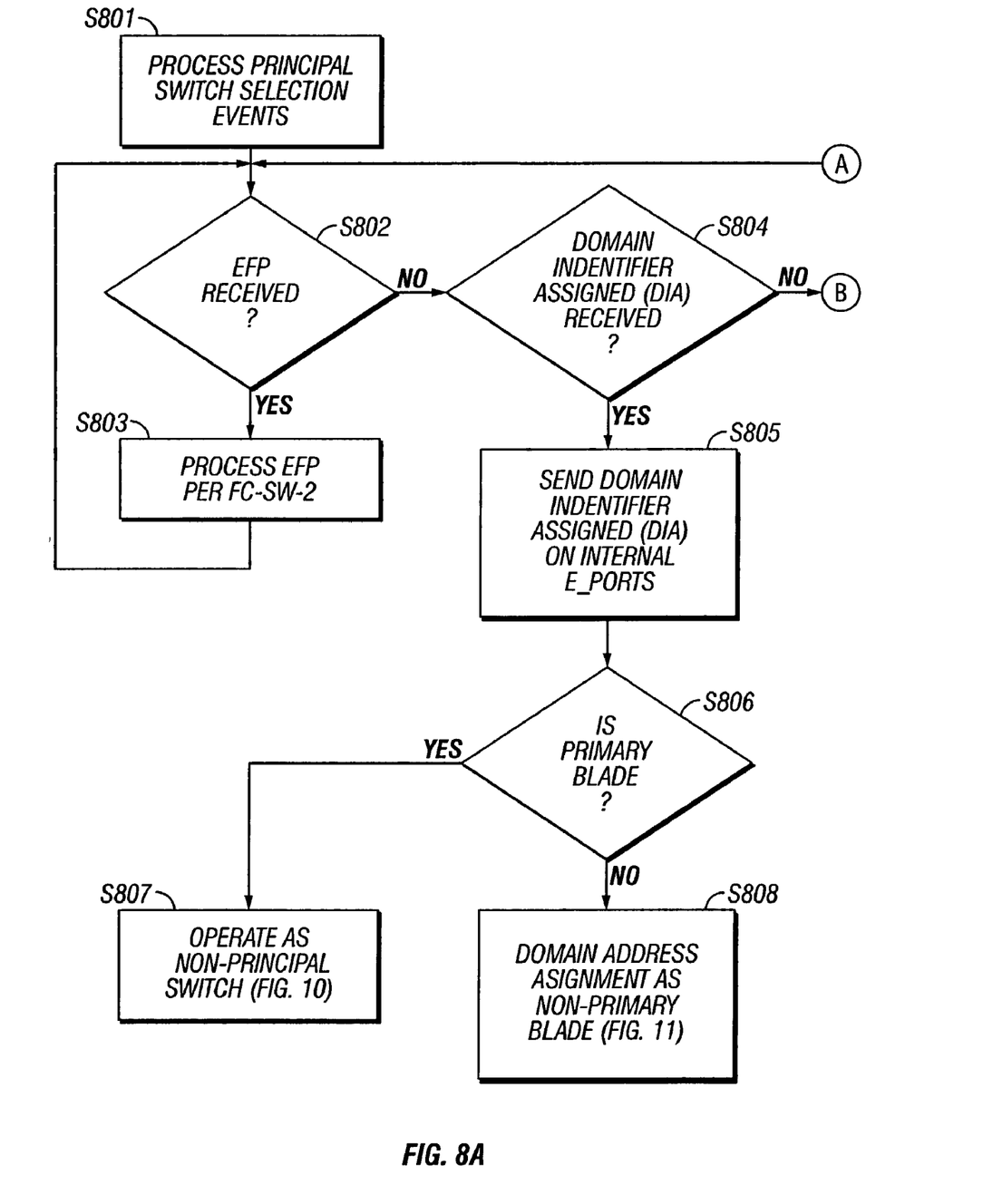
FIG. 8 is a process flow diagram of executable process steps for principal switch selection, according to one aspect of the present invention.
Figure 8B:
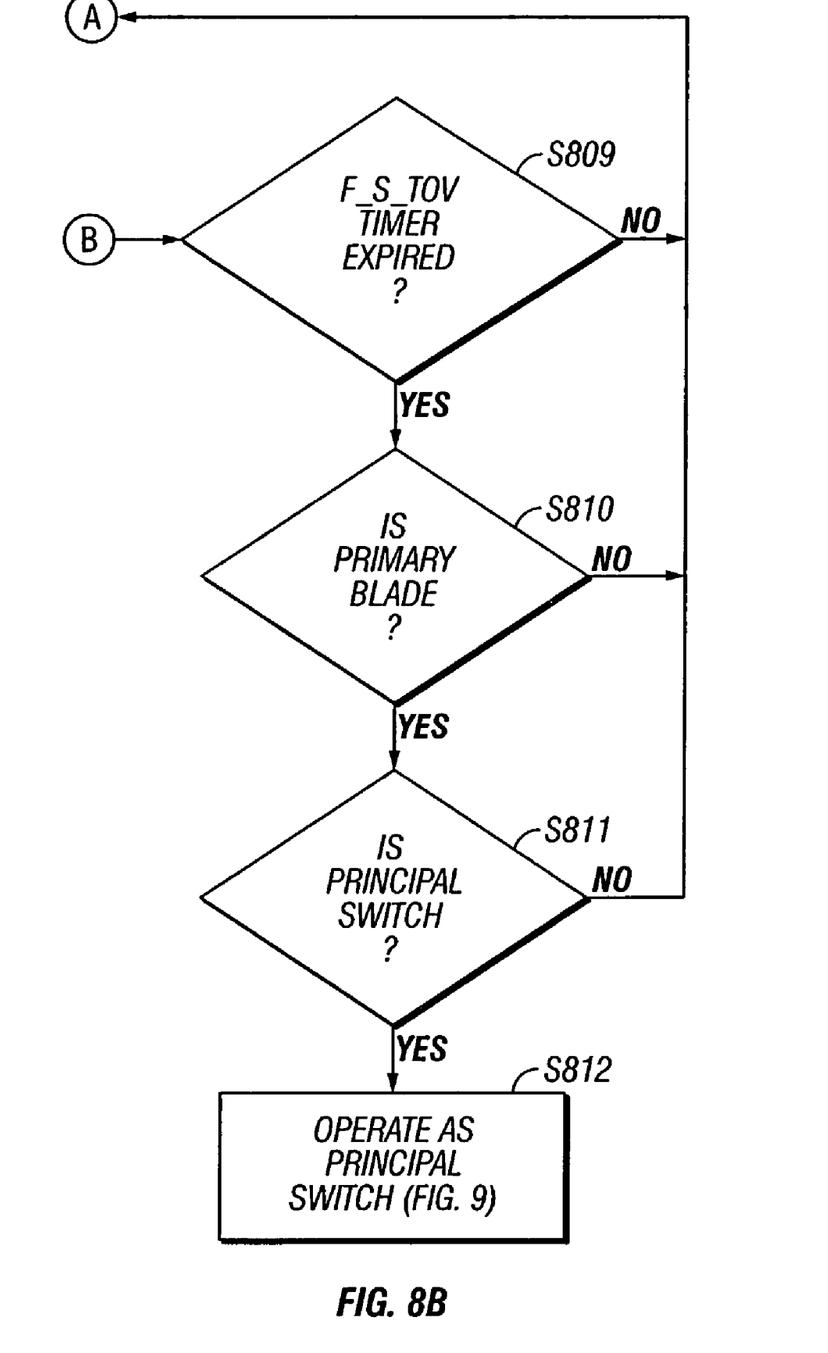

FIG. 8 is a flow diagram of executable process steps for principal switch selection (step S709). The process starts when the principal switch selection entry is completed in FIG. 7. After a principal switch is selected, each switch module transitions to one of three domain address assignment processes, described below.

Turning in detail to FIG. 8, in step S801 the principal switch selection events starts. Principal switch selection events are processed in steps S802, S804 and S809 until a principal switch is selected. The events include receipt of EFPS, DIA flags and expiration of F-S-TOV timer. These events may be processed in any order.

If an EFP is received in step S802, the process moves to step S803. In step S803, the EFP is processed as specified in FC-SW-2 for principal switch selection.

If an EFP is not received, then the process determines if a set DIA flag is received in step S804, signaling the end of principal switch selection. If the DIA flag is set then the switch module does not become the principal switch and the process moves to step S805.

In step S805, the process sends DIA flag values to internal ports to notify other switch modules that principal switch selection is complete. Other switch modules in step S804 receive DIA values sent in step S805.

In step S806, the process determines if the switch module is the primary blade. If it is the primary blade then the process moves to step S807 and the switch module operates as a non-principal switch, described below with respect to FIG. 10.

In step S806, if the switch module is not the primary blade, the process moves to step S808 and the switch module operates as a non-primary blade during domain address assignment described below with respect to FIG. 11.

If the DIA flag is not set in step S804, then in step S809, the process determines if the F-S_TOV timer has expired. If F_S_TOV timer expires in step S809, the switch module may become the principal switch.

In step S810, the process determines if the switch module is the primary blade. If yes, then in step S811, the process determines if the switch module is the principal switch. The process compares the switch's worldwide name with the principal switch's worldwide name discovered in step S803. If either step S810 or S811 is false, the process resumes wait for the next event. If the switch module is the principal switch in step S811, then the process moves to step S812 and the switch module operates as the principal switch described below with respect to FIG. 9.

Figure 9:
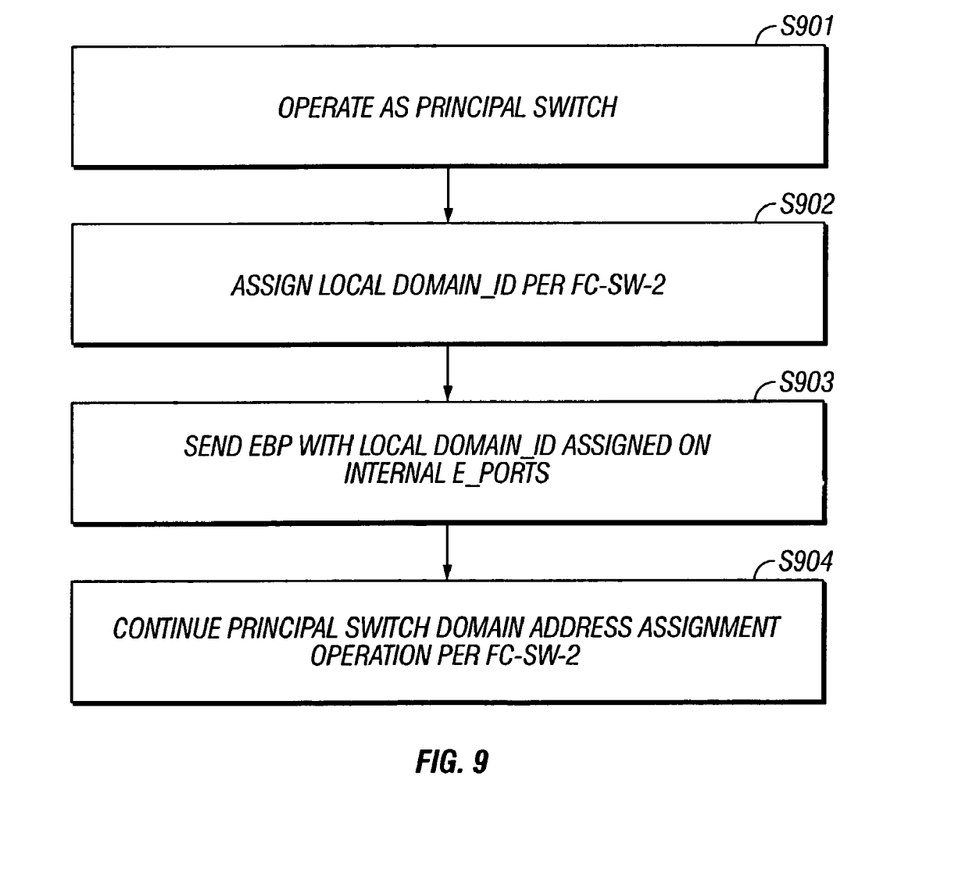
FIG. 9 is a process flow diagram of executable process steps for primary blade and principal switch operation, according to one aspect of the present invention.

FIG. 9 is a process flow diagram of executable process steps for a primary blade that operates as a principal switch (step S812, FIG. 8). In addition to standard FC-SW-2 operations, the primary blade sends the switch's local Domain_ID status to non-primary blades.

Turning in detail to FIG. 9, in step S901, a primary blade operates as the principal switch.

In step S902, the primary blade assigns the local switch Domain_ID as specified in FC-SW-2, including sending DIA flags to external E_Ports and internal ports. It is noteworthy that non-primary blades at step S804 receive the DIA flags.

In step S903, an EBP with this switch's local Domain_ID and status is sent to all non-primary blades. Other non-primary blades at step S1102, as described below, also receive these EBPs.

In step S904, the switch continues to operate as the principal switch as specified in FC-SW-2.

Figure 10:
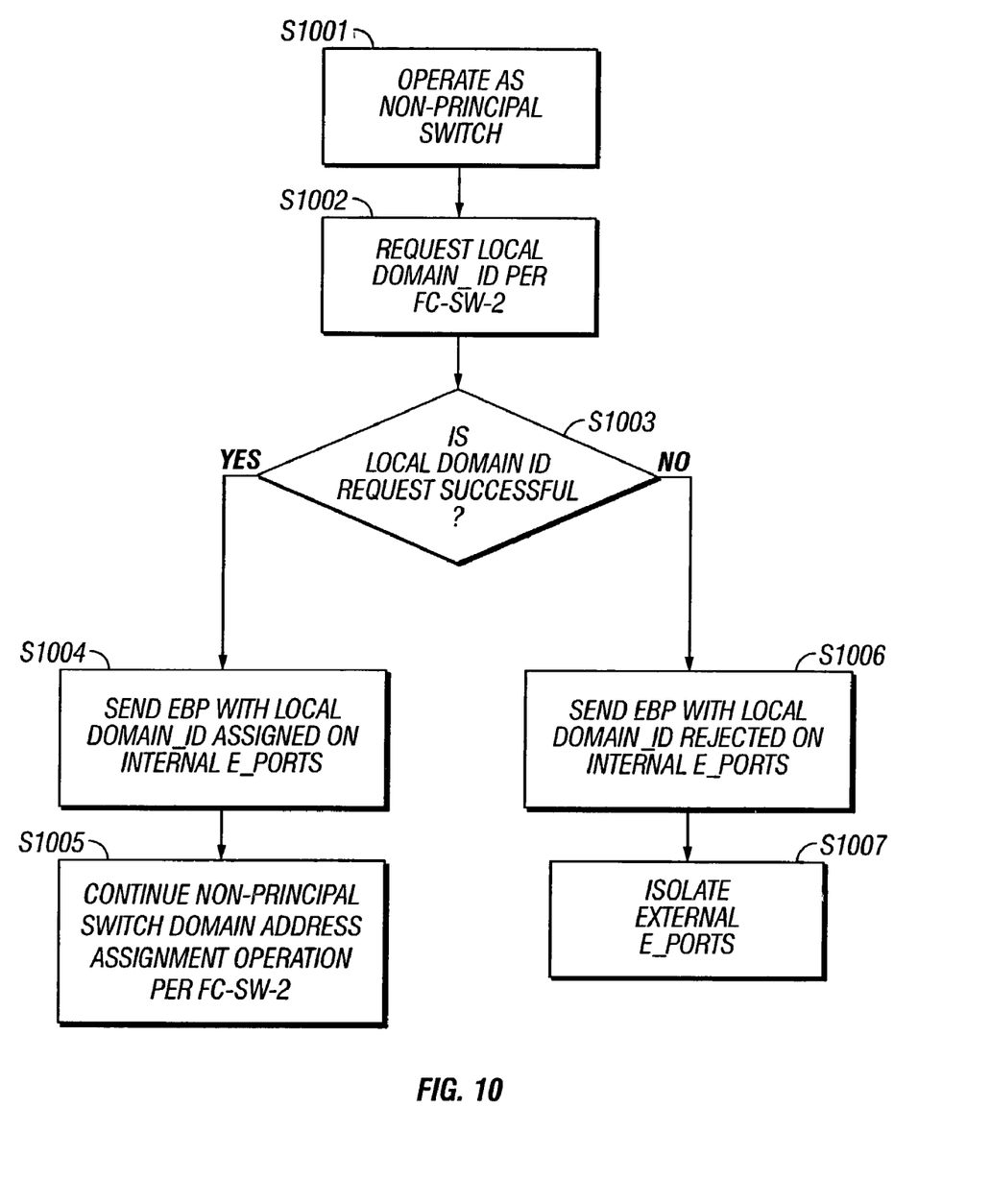
FIG. 10 is a process flow diagram of executable process steps for primary blade, and non-principal switch operation, according to one aspect of the present invention.

FIG. 10 is a process flow diagram of executable process steps for a primary blade that operates as a non-principal switch. In addition to standard FC-SW-2 operations, the primary blade sends this switch's local Domain_ID and status to non-primary blades.

Turning in detail to FIG. 10, in step S1001, a primary blade operates as a non-principal switch.

In step S1002, the primary blade requests a local switch Domain_Id as specified in FC-SW-2.

In step S1003, the process verifies if the local Domain_ID request is successful, and if successful, the process moves to step S1004.

In step S1004, an EBP with the switch's local Domain_ID and status flag is sent to all non-primary blades. Other non-primary blades at step S1102 also receive these EBPs.

In step S1005, the switch continues to operate as a non-principal switch, as specified in FC-SW-2, and sends DIA information to external E_Ports and internal ports.

Returning to step S1003, if the local Domain_ID request is unsuccessful then the process moves to step S1006. In step S1006, EBPs with the switch's local Domain_ID and status flags are sent to all non-primary blades. Other non-primary blades at step S1104 receive these EBPs. Thereafter, in step S1007, external E-port ISLs are isolated per FC-SW-2.

Figure 11:
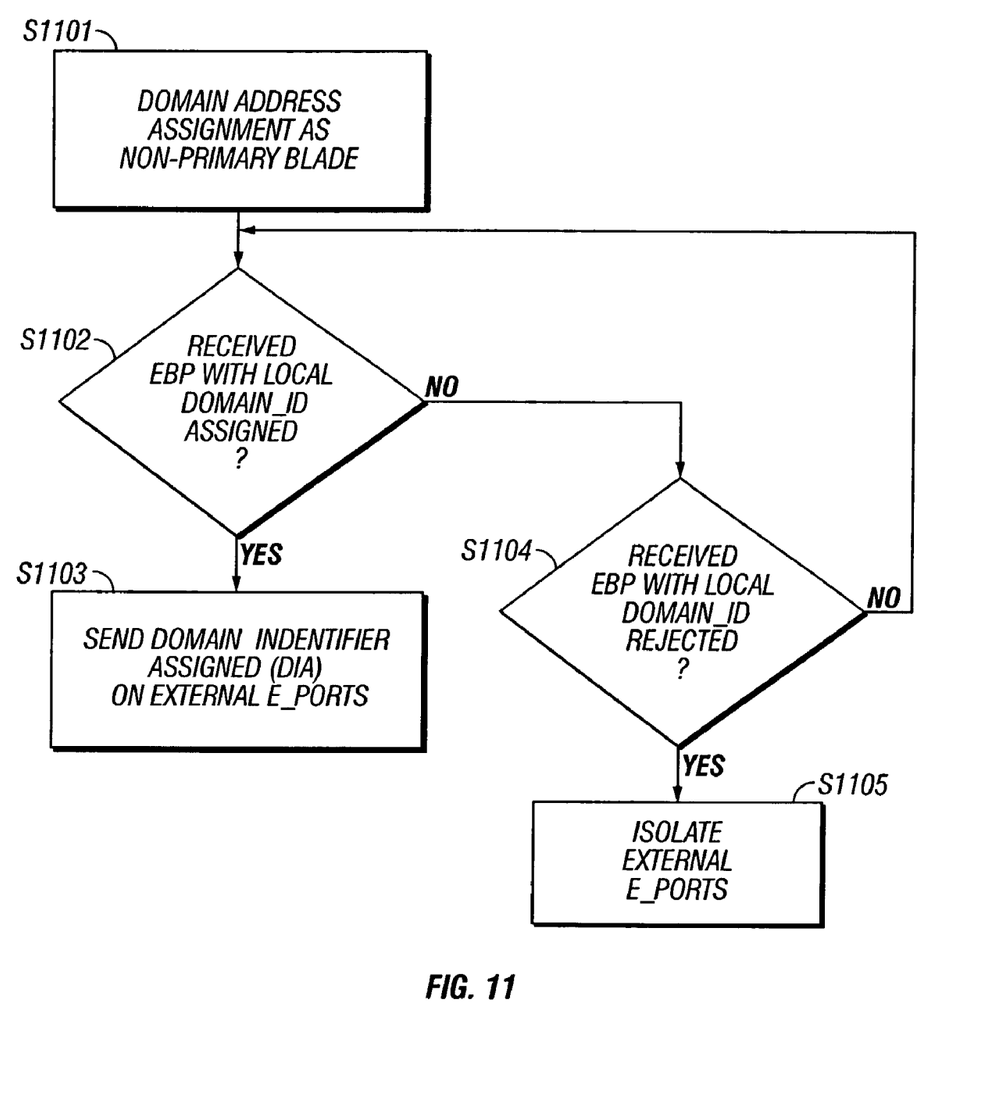
FIG. 11 is a process flow diagram of executable process steps for non-primary blade operation during Domain_ID address assignment, according to one aspect of the present invention.

FIG. 11 is a process flow diagram of executable process steps for a non-primary blade during Domain_ID assignment (S808). The non-primary blade waits until this switch's local Domain_ID and status flags are received from the primary blade.

Turning in detail to FIG. 11, in step S1101, a non-primary blade moves to Domain_ID assignment. The non-primary blade waits for an EBP indicating that the local switch Domain_ID is either accepted in step S1102 or rejected in steps S1104. When the local switch domain is accepted in step S1102, the switch module operates with the EBP local switch Domain_ID.

In step S1103, the switch module sends DIA information to external E-Port ISLs to notify neighboring switches as specified in FC-SW-2.

When the local switch domain is rejected in step S1104, the switch module operates with the EBP local switch Domain_ID and in step S1105, the switch module isolates external E-Ports.

In one aspect of the present invention, Domain_ID may be dynamically assigned.

In another aspect of the present invention, a multi-module switch can act as a principal switch, with the primary blade performing Domain_ID assignment for the multi-module switch and for other external switches. The multi-module switch can also operate as non-principal switch, with the primary blade requesting a Domain_ID assignment on behalf of the multi-module switch and informing the other modules of the assignment.

Although the present invention has been described with reference to specific embodiments, these embodiments are illustrative only and not limiting. Many other applications and embodiments of the present invention will be apparent in light of this disclosure and the following claims

What is claimed is:

1. A method for processing principal switch selection events in a fibre channel system using a multi-module fibre channel switch, comprising:
   determining if exchange fabric parameters have been received by a switch module;
   determining if domain identification values have been received by the switch module;
   sending domain identification values to all internal ports;
   operating as a non-principal switch if the switch module is also a primary blade;
   determining if a F_S_TOV timer has expired if no domain identification value is received; and
   operating as the principal switch if the switch module is a primary blade and the F_S-TOV timer has expired.

2. A method for processing principal switch selection events in a fibre channel system using a multi-module fibre channel switch, comprising:
   determining if exchange fabric parameters have been received by a switch module;
   determining if domain identification values have been received by the switch module;
   sending domain identification values to all internal ports;
   operating as a non-principal switch if the switch module is also a primary blade; and
   assigning the switch module as a non-primary blade if the domain identification value is received by the switch module and the switch module is not a primary blade.

* * * * *